United States Patent [19]

Allen

[11] 4,436,997

[45] Mar. 13, 1984

[54] METHOD FOR THE DETERMINATION OF CLAY AND MICA CONCENTRATIONS IN SUBSURFACE SANDSTONE FORMATIONS THROUGH RADIOACTIVE LOGGING

[75] Inventor: Linus S. Allen, Dallas, Tex.

[73] Assignee: Mobil Oil Corporation, New York, N.Y.

[21] Appl. No.: 295,059

[22] Filed: Aug. 21, 1981

[51] Int. Cl.³ .............................................. G01V 5/00
[52] U.S. Cl. .................................................. 250/256
[58] Field of Search ............... 250/253, 256, 261, 262, 250/269

[56] References Cited

U.S. PATENT DOCUMENTS 3,940,610  2/1976  Dennis et al. ...................... 250/262
4,096,385  6/1978  Marett ............................... 250/262

Primary Examiner—Janice A. Howell
Attorney, Agent, or Firm—Alexander J. McKillop; James F. Powers, Jr.; George W. Hager, Jr.

[57] ABSTRACT

A subsurface formation is logged to provide a record of the natural gamma radiation of the thorium, uranium, and potassium trace elements in the formation. Both the clay and mica contents of an interval of interest are determined from the natural gamma-ray activities in such interval of interest, in a clean sandstone interval and in a mica-free shale interval.

3 Claims, No Drawings

METHOD FOR THE DETERMINATION OF CLAY AND MICA CONCENTRATIONS IN SUBSURFACE SANDSTONE FORMATIONS THROUGH RADIOACTIVE LOGGING

BACKGROUND OF THE INVENTION

This invention relates to a method for radioactivity well logging and more particularly to the measurement of the clay and mica contents in a subsurface sandstone formation penetrated by a borehole.

Various methods and apparatus have been utilized in the well logging art to study the radioactive properties of subsurface formations, both where the radioactivity is natural and where it is artificially induced. Logs of such properties aid in the study of the nature of the subsurface formations, particularly in exploration for minerals and hydrocarbon deposits. Certain elements in the subsurface formations exhibit distinctive properties which are measurable in situ. Of the many elements that occur, potassium (K), uranium (U), and thorium (Th) are important natural sources of gamma radiation. Each of these elements either contains or radioactively decays to, radioactive isotopes which emit gamma radiation at characteristic energy levels. The natural gamma-ray spectrum of a given formation therefore exhibits peaks of intensity at energies corresponding to the potassium, uranium and thorium content of the formation. Such logs are conventionally termed "spectralogs". One such natural gamma-ray spectralog service is provided by Schlumberger, Limited of New York, N.Y. Another such service is provided by Dresser Industries, Inc. of Houston, Tex. Such a natural gamma-ray spectralog may also be provided by use of the method and apparatus set forth and described in U.S. Pat. No. 3,940,610 to Dennis et al.

SUMMARY OF THE INVENTION

The present invention is directed to a method for determining the clay and mica contents of a subsurface sandstone formation. The formation is logged to provide a record of the natural gamma radiation of the thorium, uranium and potassium trace elements in the formation. The clay content is determined from the record of the natural gamma radiation activity of the thorium and uranium trace elements. The mica content is determined from both the record of the total natural gamma radiation activity of the potassium trace element and the potassium gamma ray activity of the clay content.

In a further aspect, both the clay and mica contents are determined from records of the natural gamma-ray activities in an interval of interest, in a clean sandstone interval, and in a mica-free shale interval. The uranium and thorium gamma-ray activities are represented by the recorded differences in the total gamma-ray activities and the potassium gamma-ray activities.

The clay content is identified by: (i) producing the difference in the total and the potassium gamma-ray activities in the interval of interest, (ii) producing the difference in the total and the potassium gamma-ray activities in a clean sandstone interval, (iii) producing the difference in the total and the potassium gamma-ray activities in a mica-free shale interval and (iv) by taking the ratio of the difference of (i) and (ii) above to the difference of (iii) and (ii) above.

The mica content is identified by: (v) producing the difference of the weight fraction of the mica-free shale interval and the clean sandstone interval, (vi) multiplying the difference of (v) above by the weight fraction of the clay content, (vii) subtracting the results of (vi) above and the potassium weight fraction of the clean sandstone interval from the total potassium weight fraction of the interval of interest, and (viii) taking the ratio of (vii) above to the difference between the potassium weight fraction of the mica content of the interval of interest and the potassium weight fraction of the clean sandstone interval.

DESCRIPTION OF THE PREFERRED EMBODIMENT

The natural gamma-ray log, traditionally used as a measure of formation shale content, is not a reliable indicator of shaliness of some sandstones, such as found in Jurassic sandstones of the North Sea for example, because fine-grained clays are not the dominant source of natural radioactivity in these formations. Fine grained micas, such as the heavier minerals biotite and muscovite frequently contribute a significant fraction of the formation's total radioactivity. Potassium is the element responsible for the radioactivity of these micas. When such micas exist, or shaliness estimate based on the natural gamma-ray log is therefore too high.

It is therefore a specific aspect of the present invention to provide a method by which both fine grained clay and mica volume fractions can be identified from a radioactivity logging operation in sandstone of the Jurassic type. The identification of such volume fractions will be quite useful, in conjunction with bulk densities, in determining the correct porosity for such micaceous sandstones.

Such fine-grained clay and mica contents are determined in accordance with the present invention by firstly measuring the fine-grained clay concentration in relation to the uranium and thorium trace element concentrations and secondly measuring the fine-grained mica concentration in relation to the potassium trace element concentration and a correction faction based on the potassium concentration of the fine-grained clay content.

In order to carry out this aspect of the invention, the earth's natural gamma-ray activity is decomposed into its three principal elemental sources, thorium, uranium and potassium and then recorded in the form of a conventional gamma-ray spectralog. The potassium (K), uranium (U) and thorium (Th) recordings on the spectralog are related by a linear equation of the form:

$$G = aK + bU + cTh, \tag{1}$$

where G is the total natural gamma-ray activity. The lower case letters a, b and c are fixed coefficients which are calculated from the spectralog's fundamental calibration. They may also be determined from a regression analysis for a plurality of independent sets of spectralog measurements.

The clay content, or volume fraction ($V_{cl}$), is based on the thorium and uranium trace elements and is expressed in terms of the differences between the total natural gamma-ray activity, G, and potassium trace element natural gamma-ray activity, aK, as follows:

$$V_{cl} = \frac{(G - aK) - (G - aK)_{ss}}{(G - aK)_{cl} - (G - aK)_{ss}}, \tag{2}$$

where, G-aK is the total thorium and uranium natural gamma-ray activity as represented by the difference between the total natural gamma-ray activity and the potassium natural gamma-ray activity in the zone of interest., $(G-aK)_{ss}$ is the value of the G-aK difference recorded in a clean sandstone and $(G-aK)_{cl}$ is the vaue of G-aK in a mica-free shale interval. It is to be noted that equation (2) could be written alternatively in terms of bU+cTh in place of aK.

The clay weight fraction ($W_{cl}$) is determined from the clay volume fraction using the densities of the clay ($\rho_{cl}$) and the formation ($\rho$):

$$W_{cl} = V_{cl}(\rho_{cl}/\rho), \quad (3)$$

To determine the mica content, or weight fraction ($W_m$), the potassium weight fraction (K) of the formation is assumed to have three sources, clean sandstone, fine-grained clay minerals and fine-grained mica as follows:

$$K = W_{ss}K_{ss} + W_{cl}K_{cl} + S_m K_m, \quad (4)$$

where the potassium weight fractions of clean sandstone, clay and mica are represented by $K_{ss}$, $K_{cl}$ and $K_m$, respectively and wherein:

$$W_{ss} + W_{cl} + W_m = 1, \quad (5)$$

Utilizing equation (5) in equation (4):

$$K = (1 - W_{cl} - W_m)K_{ss} + W_{cl}K_{cl} + W_m K_m, \quad (6)$$

from which the mica content is:

$$W_m = \frac{K - K_{ss} - W_{cl}(K_{cl} - K_{ss})}{K_m - K_{ss}} \quad (7)$$

In the foregoing, $K_{ss}$ and $K_{cl}$ are read directly from the potassium recording on the spectralog from a clean sandstone interval and a mica-free shale interval respectively. To specify $K_m$ it is sufficient to assume that the mica is a mixture of biotite and muscovite having an average potassium content of 9% by weight. Both these micas are frequently observed but their relative abundances vary considerably. Fortunately the potassium content of both is about 9%.

In accordance with the foregoing it can be seen that the present invention provides a method for determining clay content of the formation based on the trace elements thorium and uranium, while the mica content is based on the trace element potassium and the independently-determined clay content.

I claim:

1. A method for determining the clay content of a subsurface sandstone formation from a record of the natural gamma radiation of the thorium, uranium and potassium trace elements in said formations, comprising the steps of:

(a) producing a first measurement of the difference in the total and the potassium gamma-ray activities of the interval of interest,
    (b) producing a second measurement of the difference in the total and the potassium gamma-ray activities in a clean sandstone interval,
    (c) producing a third measurement of the difference in the total and the potassium gamma-ray activities in a mica-free shale interval, and
    (d) identifying the volume fraction of clay content in the interval of interest as the ratio of the difference of said first and second measurements to the difference of said second and third measurements.

2. The method of claim 1 wherein the weight fraction of said clay content is determined by multiplying the volume fraction of said clay content by the measured ratio of clay density to total formation density.

3. The method of claim 2 wherein the mica content of said subsurface sandstone formation is determined by the steps of:

(a) producing a fourth measurement of the difference in the potassium weight fractions of the mica-free shale interval and its clean sandstone interval,
    (b) producing a fifth measurement by multiplying said fourth measurement by the weight fraction of said clay content,
    (c) producing a sixth measurement by subtracting said fifth measurement and the potassium weight fraction of the clean sandstone interval from the total potassium weight fraction of the interval of interest, and
    (d) identifying the weight fraction of the mica content of the interval of interest as the ratio of said sixth measurement to the difference between the potassium weight fraction of the mica content of the interval of interest and the potassium weight fraction of the clean sandstone interval.

* * * * *

UNITED STATES PATENT AND TRADEMARK OFFICE
CERTIFICATE OF CORRECTION

PATENT NO. : 4,436,997
DATED : March 13, 1984
INVENTOR(S) : Linus Scott Allen

It is certified that error appears in the above-identified patent and that said Letters Patent are hereby corrected as shown below:

Col. 3, line 6, "vaue" should read --value--.

Col. 4, line 23 (Claim 1, subparagraph (d)), change "second and third" to read --third and second--.

Col. 4, line 44 (Claim 3, subparagraph (d)), delete "the" before "mica".

Col. 4, lines 44-45 (Claim 3, subparagraph (d)), delete the phrase "content of the interval of interest".

Signed and Sealed this

Twenty-seventh Day of November 1984

[SEAL]

Attest:

Attesting Officer

GERALD J. MOSSINGHOFF

Commissioner of Patents and Trademarks